United States Patent
Bauer et al.

(10) Patent No.: US 11,993,971 B2
(45) Date of Patent: May 28, 2024

(54) METHOD FOR DETERMINING AND SPECIFYING THE NECESSARY CLOSING SPEED OF A MOTOR-OPERATED VEHICLE DOOR AT THE MOMENT OF REACHING AN INITIAL CLOSURE DETENT

(71) Applicant: Conti Temic microelectronic GmbH, Nuremberg (DE)

(72) Inventors: Beat Bauer, Friedrichshafen (DE); Timur Atas, Oberteuringen (DE)

(73) Assignee: Conti Temic microelectronic GmbH, Ingolstadt (DE)

( * ) Notice: Subject to any disclaimer, the term of this patent is extended or adjusted under 35 U.S.C. 154(b) by 52 days.

(21) Appl. No.: 17/726,203

(22) Filed: Apr. 21, 2022

(65) Prior Publication Data

US 2022/0341244 A1    Oct. 27, 2022

(30) Foreign Application Priority Data

Apr. 26, 2021    (DE) .................... 10 2021 204 113.2

(51) Int. Cl.
*E05F 15/00* (2015.01)
*E05F 15/611* (2015.01)

(52) U.S. Cl.
CPC ......... *E05F 15/611* (2015.01); *E05Y 2400/36* (2013.01); *E05Y 2900/531* (2013.01)

(58) Field of Classification Search
CPC . E05F 15/00; E05F 15/41; E05F 15/44; E05F 15/603; E05F 15/611;

(Continued)

(56) References Cited

U.S. PATENT DOCUMENTS

| 5,982,126 A | 11/1999 | Hellinga et al. |
| 10,538,149 B1 * | 1/2020 | DiCarlo ................. E05F 15/73 |

(Continued)

FOREIGN PATENT DOCUMENTS

| CA | 2365474 A1 | 4/1992 |
| DE | 19649698 A1 | 10/1997 |

(Continued)

OTHER PUBLICATIONS

Office Action dated Jan. 10, 2022 from corresponding German patent application No. 10 2021 204 113.2.

(Continued)

*Primary Examiner* — Chi Q Nguyen

(57) ABSTRACT

A method for determining and specifying necessary closing speed of a motor-operated vehicle door at the moment of reaching an initial closure detent by means of a control unit is described. The motor current of the door motor is determined and compared with a calculated maximum current, wherein the maximum current results from a motor armature resistance measured at the start of the door movement, from a minimum supply voltage of the control unit and from an adjustable factor. If the determined current is higher than the maximum current, the value of an adaptation table is changed and a higher closing speed is specified by the control unit for the next closing movement of the vehicle door; and, if the determined current is lower than the maximum current, a lower closing speed is specified by the control unit for the next closing movement of the vehicle door.

2 Claims, 2 Drawing Sheets

(58) Field of Classification Search
CPC .......... E05Y 2400/36; E05Y 2400/452; E05Y 2400/514; E05Y 2900/531; E05Y 2900/532
See application file for complete search history.

(56) References Cited

U.S. PATENT DOCUMENTS

| | | | | |
|---|---|---|---|---|
| 11,365,580 | B2* | 6/2022 | Gempel | ................ E05F 15/46 |
| 2004/0090083 | A1 | 5/2004 | Greuel | |
| 2005/0151495 | A1 | 7/2005 | Miyauchi | |
| 2005/0168010 | A1* | 8/2005 | Cleland | ................ E05F 15/63 |
| | | | | 296/146.8 |
| 2006/0181108 | A1* | 8/2006 | Cleland | ................ E05F 15/43 |
| | | | | 296/146.4 |
| 2007/0299588 | A1* | 12/2007 | Warren | ................ E05F 15/611 |
| | | | | 701/49 |
| 2009/0100758 | A1* | 4/2009 | Nagakura | ............... E05F 15/70 |
| | | | | 49/506 |
| 2015/0240548 | A1 | 8/2015 | Bendel et al. | |
| 2016/0053524 | A1* | 2/2016 | Serban | ................ E05F 15/611 |
| | | | | 701/49 |
| 2017/0247926 | A1* | 8/2017 | Elie | ......................... E05F 15/40 |
| 2017/0342758 | A1* | 11/2017 | Grudzinski | ........ B62D 33/0273 |
| 2018/0363357 | A1* | 12/2018 | Polewarczyk | .......... E05F 15/40 |
| 2019/0048646 | A1* | 2/2019 | Tachibana | ............... E05F 15/77 |
| 2022/0149761 | A1* | 5/2022 | Battlogg | ................ E05F 15/63 |
| 2022/0356746 | A1* | 11/2022 | Konchan | ................ E05F 15/70 |

FOREIGN PATENT DOCUMENTS

| | | |
|---|---|---|
| DE | 102005063025 A1 | 7/2007 |
| DE | 102012018093 A1 | 3/2014 |
| DE | 102016213083 A1 | 1/2018 |
| DE | 102017211483 A1 | 1/2019 |
| DE | 102019208783 A1 | 12/2020 |
| JP | 2006009485 A | 1/2006 |

OTHER PUBLICATIONS

Office Action dated Aug. 30, 2023 from corresponding Chinese patent application No. 202210445624.9.

* cited by examiner

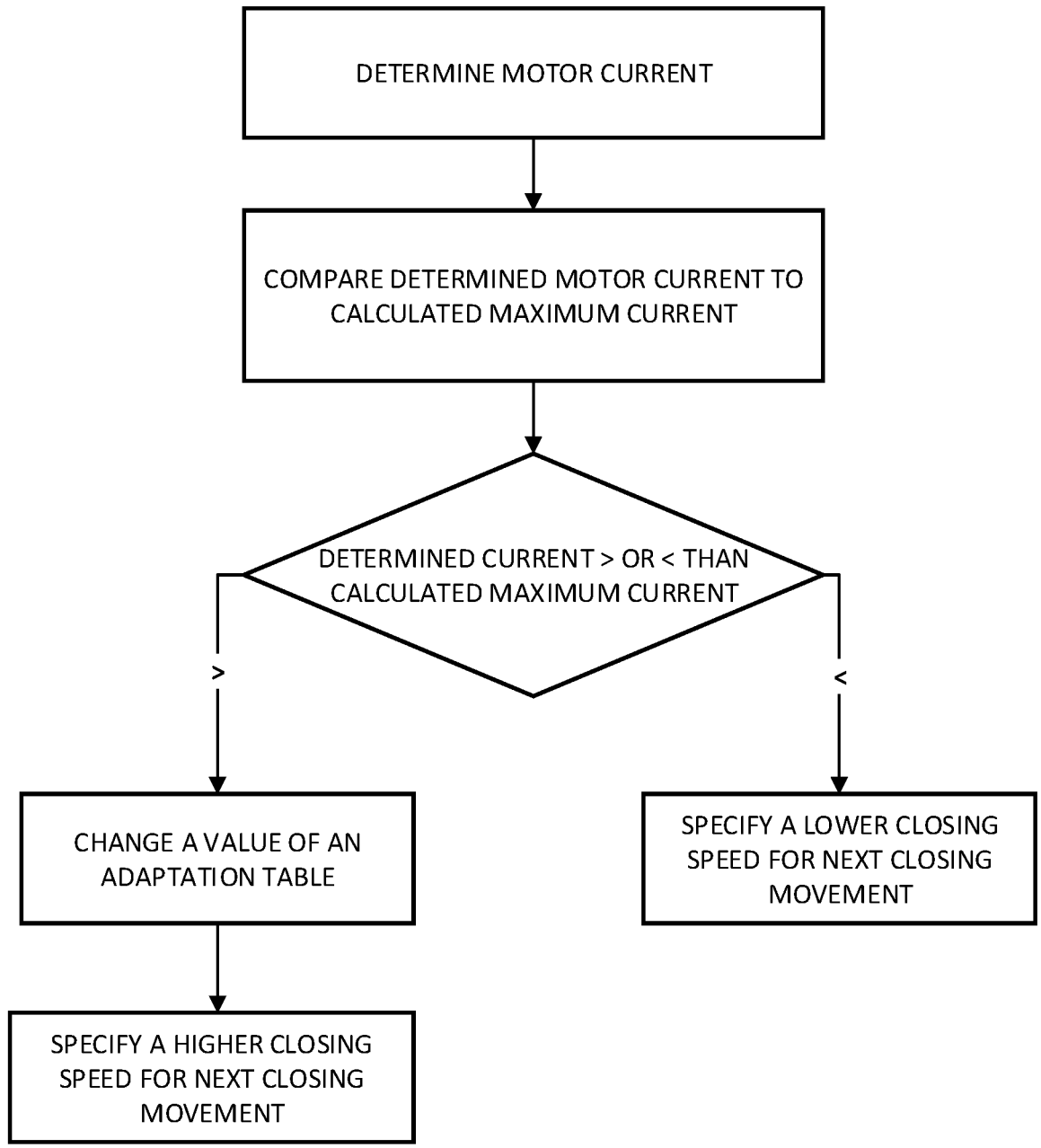

METHOD FOR DETERMINING AND SPECIFYING THE NECESSARY CLOSING SPEED OF A MOTOR-OPERATED VEHICLE DOOR AT THE MOMENT OF REACHING AN INITIAL CLOSURE DETENT

BRIEF DESCRIPTION OF THE DRAWINGS

The disclosure is explained in more detail below on the basis of an exemplary embodiment with the aid of a figure, in which

FIG. 2 shows a schematic flowchart of an exemplary method.

DETAILED DESCRIPTION

Figure 1:
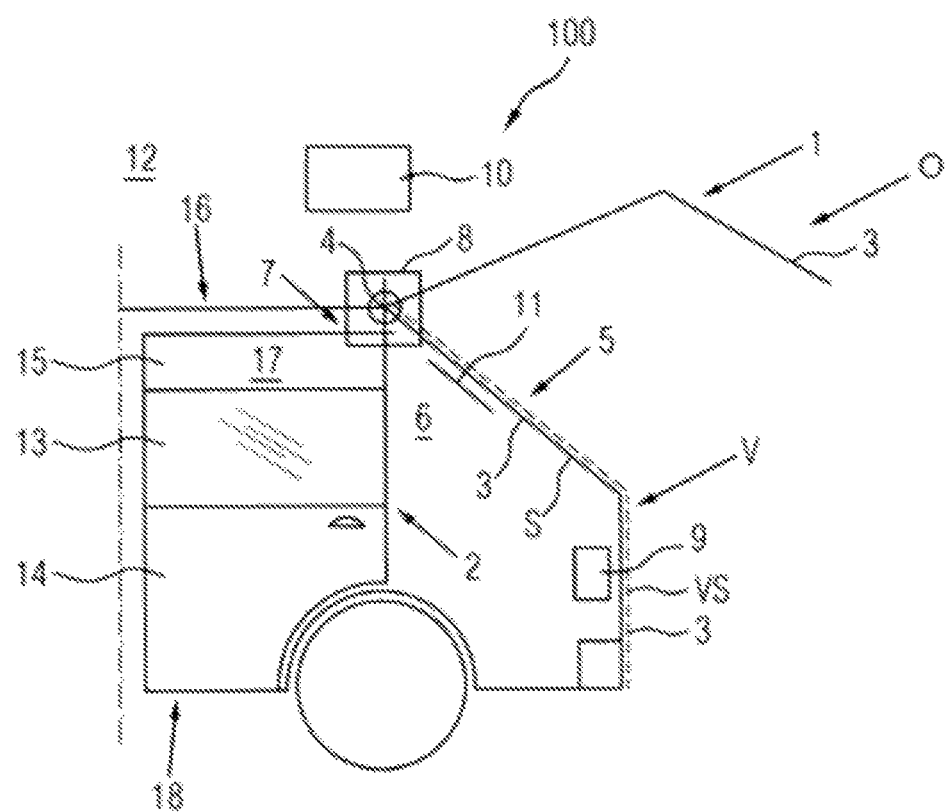
FIG. 1 shows a schematic view of a vehicle.

Modern vehicles frequently have doors which are driven by means of an actuator and which are arranged pivotably or displaceably on a body or on a superstructure of the vehicle. The door can be, for example, a hood or a flap, for example a trunk flap or a tailgate. However, the door can also be a pivotable side door of the vehicle or else a sliding roof of the vehicle. Such doors are increasingly driven by means of an actuator such that the door can be moved by means of the actuator between an open position and a closing position.

To lock the door to the body, vehicles conventionally have a closure mechanism. Modern closure mechanisms have a two-stage closure system consisting of an initial closure detent and a main closure detent. When the door is in engagement with the initial closure detent, the door then can no longer be readily moved away from the body, or a further movement path of the door is possible only toward the main closure detent. When the door is locked with the main closure detent, the door is locked fixedly to the body of the vehicle.

To move the door into the initial closure detent or main closure detent, use is preferably made, for example in the case of power-operated doors, of a respective actuator moving the door toward the initial closure detent and subsequently toward the main closure detent. However, it has been shown that, for example, the movement of the door toward the initial closure detent may be dependent on a wide variety of factors, possibly leading to an undesired immediate closing operation at the main closure detent.

In this connection, a predetermined speed of the door, leading to noise characteristics that are advantageous for the user of the vehicle during the closing of the door, is generally desired. This speed may, for example, be determined empirically or defined at the factory. In current vehicles, the door is generally closed at a speed value set fixedly at the factory.

Conventionally, the speed is set to such a high value that moving of the door by means of the actuator in order to engage in the initial closure detent can be ensured. However, this may lead to the door being moved by means of the actuator at an unnecessarily high speed into the initial closure detent.

To seal and shield the vehicle interior in relation to the outside world, rubber seals are used on the doors and the tailgate. To compress the seal, use is made of closing aids, i.e. locks, which operate with two detents, an initial closure detent and a main closure detent and which, when the initial closure detent is reached, can use a separate electric motor to compress the seal until the main closure detent is reached. The drives of an electric tailgate are not of a sufficient magnitude to compress the seal of the tailgate and therefore to reliably close the tailgate until it reaches the initial closure detent. This takes place only via momentum of the tailgate, i.e. via sufficient kinetic energy. Tailgates therefore obtain a fixed worst case parameterization: The tailgate always also has to be able to overcome the maximum closing forces, even if the latter occur only during the first closing operations at the automotive plant. As soon as the seal has settled (or also immediately, in the case of vehicles with relatively low tolerances), significantly lower kinetic energy would be sufficient to reliably close the tailgate. The excess energy leads to an increased production of noise, an impression of less quality and significantly higher clamping forces in the event of an obstacle.

It has also been shown that, for example, ageing- or time-induced changes to the door seal (outgassing, softening, embrittlement of the seal) lead to a changed resistance opposing the movement of the door. These changes can ultimately lead to the door reaching the initial closure detent not at the desired speed, but at a higher speed which differs from the desired speed by more than a predetermined value.

For this purpose, DE 10 2019 208 783 A1 discloses a method for determining an abnormal closing operation of a vehicle door driven by means of an actuator, in which the door is lockable by means of a closure mechanism having an initial closure detent and a main closure detent, wherein first of all an actual speed of the door at the initial closure detent is determined and then an abnormal closing operation ascertained if the determined actual speed deviates by more than a predefined speed threshold value from a desired speed at the initial closure detent. The actual speed can be determined here, for example, by means of a rotational speed of the actuator.

It is the object of the disclosure to specify an alternative possibility for determining the necessary closing speed of a motor-operated vehicle door.

FIG. 1 shows a schematic view of a vehicle 1, such as, for example, of a motor vehicle. The vehicle 1 has a body 2 which is designed as a self-supporting superstructure of the vehicle 1. The vehicle 1 furthermore has a door 3 which is illustrated by way of example in FIG. 1 as a tailgate. In other exemplary embodiments, the door 3 can be, for example, a side door, a sliding door or a sliding roof. The door 3 is mounted movably on the body 2. In the specific example of FIG. 1, the door 3 is mounted pivotably on the body 2. The pivot axis 4 runs here at least substantially in the transverse direction of the vehicle. However, in other exemplary embodiments, the door 3 may also be mounted displaceably on the body 2.

As can be seen from FIG. 1, the door 3 is movable relative to the body 2 between at least one open position O and a closing position S. If, for example, the door 3 is moved from the open position O into the closing position S, the door 3 is closed and, in the process, passes along its movement path toward the closing position S into an initial closure region V which has at least one or more initial closing positions VS. The initial closing position VS is located here, for example, between the open position O and the closing position S. In the initial closure region V, the door 3 enters into engagement with an initial closure detent of a closure mechanism, as has already been described in DE 10 2019 208 783 A1.

As can furthermore be seen in FIG. 1, the door 3 is assigned a corresponding opening 5 which is delimited by the body 2 and, in the specific example of FIG. 1, is designed as a rear opening or else trunk opening. In the open position O, the door 3 releases at least a partial region of the opening 5 such that, for example, objects to be transported can be loaded into the vehicle 1, for example into the rear-side storage space 6 thereof, or unloaded from the storage space 6, via the released partial region. In the closing position S, the door 3 closes at least the partial region. For example, the door 3 closes the partial region of the opening 5 even if the door 3 is in the initial closure region V and is therefore in engagement with the initial closure detent. The initial closure region V and the initial closing positions VS differ from the closing position S for example in that, in the closing position S in comparison to the initial closure region V, the door 3 is arranged closer to the body 2 and, as a result, the opening 5 is completely closed. In the closing position S, the door 3 is in engagement with a main closure detent, as a result of which the door 3 is completely locked.

As can furthermore be seen in FIG. 1, the vehicle 1 has a drive 7 which is illustrated schematically in FIG. 1 and which comprises an actuator 8 and at least one further motor 9. The actuator 8 and the at least one further motor 9 are designed, for example, as electric motors, wherein the further motor 9 is different from the actuator 8, or is provided in addition to the actuator 8. The actuator 8 and the further motor 9 can be installed in the same region of the vehicle, for example in the region of the fastening of the door 3 to the body or, as illustrated schematically in FIG. 1, at different locations. The actuator 8 is designed to bring the door 3 from the open position O into the initial closure region V and therefore into engagement with the initial closure detent. The at least one further motor 9 is designed to move the door 3 from the initial closure region V into the closing position S and therefore to bring the door 3 into engagement with the main closure detent. The further motor 9 therefore acts as what is referred to as a closing aid with which the door 3 is moved from the initial closure region V or from the initial closing position VS and thus from the initial closure detent into the closing position S or into the main closure detent, and is therefore closed.

As can furthermore be seen in FIG. 1, the vehicle 1 furthermore has a control device 100 for controlling a closing operation of the door 3. The control device 100 here has a control unit 10 which, for controlling the operation thereof, is connected for signal conduction and in terms of operation to the actuator 8 and to the at least one further motor 9. The control unit 10 is designed here for example to activate the actuator 8 and the at least one further motor 9 in such a manner that, with an appropriate drive power, they move the door 3 from the open position O toward the initial closure region V and from there to the closing position S. The control unit 10 is also designed to determine, for example to measure, the motor current, the resistance of the motor armature and the supply voltage of the control unit 10.

As can furthermore be seen in FIG. 1, the vehicle 1 furthermore comprises a sealing element 11 which is illustrated schematically in conjunction with FIG. 1 and which can be designed, for example, as a rubber seal. The sealing element 11 is fastened to the body 2. The sealing element 11 is elastically deformable. By moving the door 3 from the open position O into the initial closure region V, the door 3 first of all comes into contact with the sealing element 11, as a result of which the sealing element 11 is somewhat compressed. If the door 3 is finally moved from the initial closure region V into the closing position S, the sealing element 11 is compressed more greatly. The deformation, for example elastic deformation, of the sealing element 11 constitutes a resistance which opposes the closing movement direction of the door 3 and which ultimately has to be overcome by the actuator 8 and the at least one further motor 9.

An environment 12 of the vehicle 1 is likewise illustrated in FIG. 1. The environment 12 of the vehicle 1 has, for example, an ambient temperature of the vehicle 1. The ambient temperature of the vehicle 1 can correspond, for example, to an outside temperature of the vehicle 1. A further door 14 which can likewise be moved between an open position and a closing position is likewise illustrated in FIG. 1. A window 13 which can likewise be moved between an open position and a closing position is likewise illustrated in FIG. 1. The window 13 is, for example, a side window which can be opened and closed. If, for example, the window 13 is opened, the window 13 releases at least a partial region 15 of a corresponding window opening 16 such that, for example, during the closing of the door 3, air can flow out of an interior 17 of the vehicle 1 into the environment via the released partial region 15. The air initially included in the interior 17 therefore likewise opposes the closing movement or the closing operation of the door 3 in the form of a resistance which in turn ultimately has to be overcome by the actuator 8 and the at least one motor 9, wherein the resistance opposing the closing movement of the door 3 ultimately depends on the size of the partial region 15 and the position of the further door 14. For example, in a closed state of the window 13 and a closed state of the further door 14, the resistance opposing the closing operation of the door 3 by the air included in the interior 17 is greater than the resistance opposing the closing operation of the door 3 by an at least partially open window 13 and/or an at least partially open door 14. In other words, the resistance which the actuator 8 and optionally the further motor 9 have to overcome during the closing of the door 3, in addition to depending on the sealing element 11, also depends, for example, on a size of the partial region 15 and/or on a size of a door opening 18.

In a manner according to the disclosure, the motor current of the door motor 8, 9 is now determined by the control unit 10 and compared with a calculated maximum current, wherein the maximum current is produced from a motor armature resistance measured at the start of the door movement, from a minimum supply voltage of the control unit 10 and from an adjustable factor. Somewhat of a reserve can be kept available by the adjustable factor; it can be determined, for example, empirically.

If the current which is determined and, for example, which is measured is higher than the maximum current, the value of an adaptation table is changed and, for the next closing movement of the vehicle door 2, a higher closing speed is specified by the control unit 10 and is thus adapted to the real and instantaneous situation at the vehicle 1. If the determined current is lower than the maximum current, a lower closing speed is specified by the control unit 10 for the next closing movement of the vehicle door 2.

In this way, the necessary closing speed of a motor-operated vehicle door at the moment of reaching an initial closure detent can be determined and specified and adapted continuously in an advantageous manner.

The invention claimed is:

1. A method for determining and specifying a necessary closing speed of a motor-operated vehicle door at a moment of reaching an initial closure detent:

at a control unit, determining and comparing motor current of a door motor with a calculated maximum current, wherein the calculated maximum current results from a motor armature resistance measured at a start of a door movement, from a minimum supply voltage of the control unit and from an adjustable factor;

if the determined current is higher than the calculated maximum current, changing a value of an adaptation table and specifying at the control unit a higher closing speed for next closing movement of the vehicle door and thus adapting to actual and instantaneous situation at the vehicle; and;

if the determined current is lower than the calculated maximum current, specifying at the control unit a lower closing speed for the next closing movement of the vehicle door.

2. The method as claimed in claim 1, wherein the motor current is determined by a measurement.

* * * * *